April 23, 1968  W. C. ZETYE  3,379,269
VARIABLE RATE SINGLE-LEAF SPRING INDEPENDENT REAR SUSPENSION
Filed Dec. 14, 1966
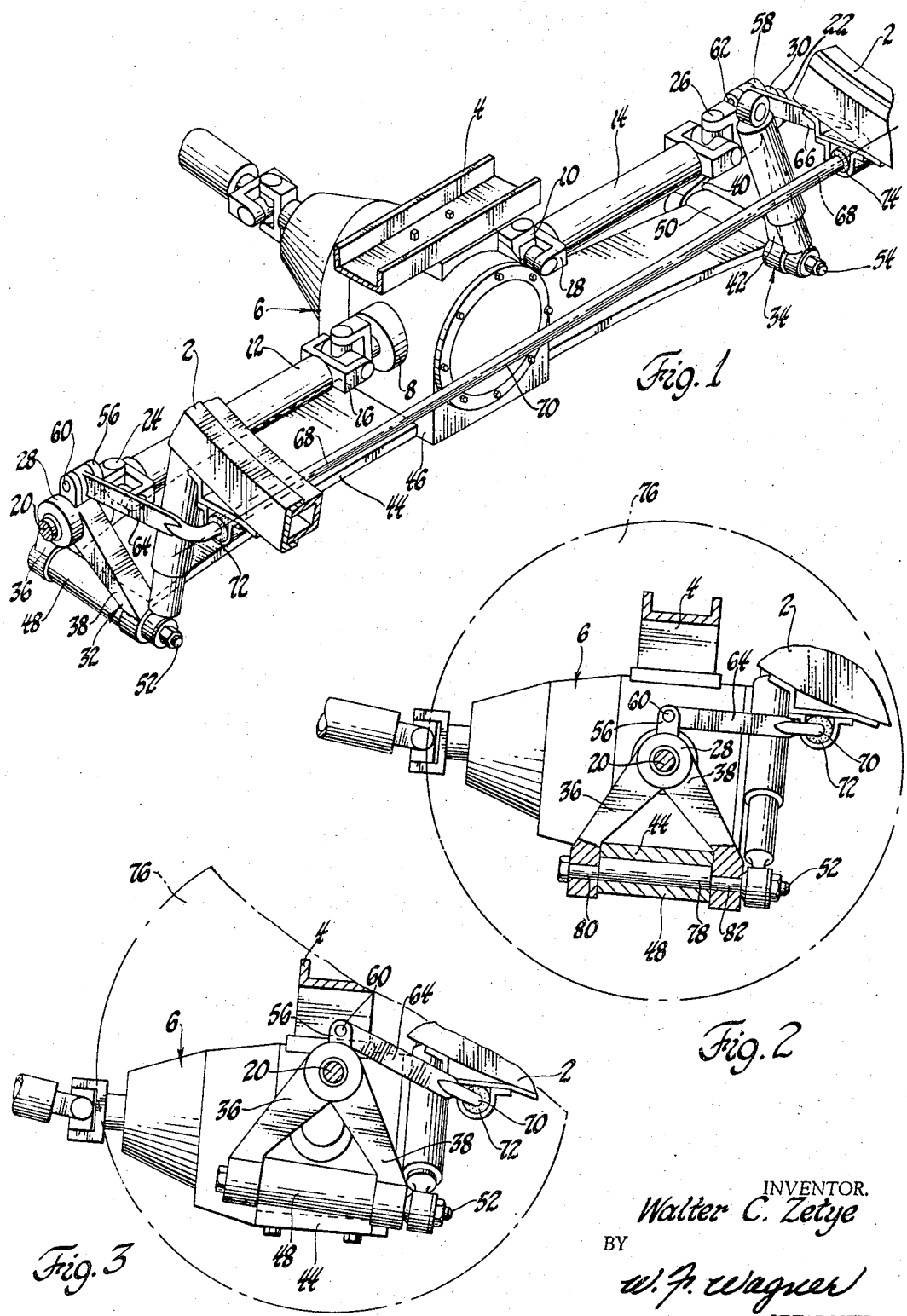
INVENTOR.
Walter C. Zetye
BY
W. F. Wagner
ATTORNEY United States Patent Office 3,379,269
Patented Apr. 23, 1968

3,379,269
VARIABLE RATE SINGLE-LEAF SPRING INDEPENDENT REAR SUSPENSION
Walter C. Zetye, Southfield, Mich., assignor to General Motors Corporation, Detroit, Mich., a corporation of Delaware
Filed Dec. 14, 1966, Ser. No. 601,739
10 Claims. (Cl. 180—73)

This invention relates to vehicle suspension and more particularly to an independent suspension for the rear wheels of a vehicle incorporating a single-leaf spring which acts as one of the control arms guiding the wheel deflection path as well as providing the elastic medium supporting the sprung mass relative to the wheels.

An object of the invention is to provide an improved independent wheel suspension.

Another object is to provide an independent single-leaf spring rear suspension in which the spring is caused to deflect simultaneously in both a bending mode and a torsional mode thereby producing a variable rate at the wheels.

A further object is to provide a suspension of the stated character in which the wheel supporting structure partakes of angular movement corresponding to the torsional deflection of the spring to thereby provide geometric anti-squat.

A still further object is to provide an arrangement of the stated character in which torsional deflection of the single-leaf spring is accomplished by linkage associated with a torsional roll stabilizer.

These and other objects, advantages and features of the invention will become more readily apparent as reference is had to the accompanying specification and drawing wherein:

FIGURE 1 is a fragmentary perspective view of a vehicle rear suspension in accordance with the invention;

FIGURE 2 is a fragmentary side elevational view of the structure shown in FIGURE 1 with various parts being shown in the positions occupied when the vehicle sprung mass is at design height; and FIGURE 3 is a view similar to FIGURE 2 showing the relative disposition of the parts during compression deflection of the wheel associated therewith.

Referring now to the drawings and particularly FIGURE 1, there is shown a portion of a vehicle chassis in which the reference numeral 2 generally designates frame side rail members upon which the vehicle body, not shown, is mounted. Extending transversely between side rails 2 is a frame cross member 4 having suspended transversely centrally therebeneath a differential assembly 6 which includes oppositely extending output members 8 and 10. Members 8 and 10 are operatively connected to transversely oppositely extending live half axles 12 and 14 by inboard universal joints 16 and 18. At their outer ends, axles 12 and 14 are operatively connected to wheel spindles 20 and 22 by outboard universal joints 24 and 26. Spindles 20 and 22 are rotatably supported in hub portions 28 and 30 of wheel spindle supports 32 and 34. Spindle supports 32 and 34 include downwardly diverging leg portions 36, 38 and 40, 42, respectively, the lower ends of which are formed with longitudinally aligned openings, not shown, for a purpose shortly to be described.

Extending transversely beneath half axles 12 and 14 is a relatively wide single-leaf spring 44, the central portion of which is rigidly secured to the base 46 of differential assembly 6. At its opposite outer extremities, spring 44 is formed with rolled eyes 48 and 50 which occupy the longitudinal space between legs 36, 38 and 40, 42, respectively, of supports 32 and 34. The bore formed by eyes 48 and 50 are axially aligned with the openings previously mentioned in legs 36, 38 and 40, 42. Each support and the adjacent eye at each end of the spring are then connected together by a single pivot bolt 52 and 54 thus permitting relative angular movement between the supports and spring about the axis of the bolt only.

According to the principal feature of the invention, supports 32 and 34 are additionally provided with upwardly projecting clevis portions 56 and 58 which are pivotally connected by pivot pins 60 and 62 to the forward ends of longitudinally extending lever members 64 and 66, respectively. The rearward ends of lever members 64 and 66 in turn are pivotally connected to frame side rails 2 on a common transversely extending axis 68. In the embodiment shown, lever members 64 and 66 comprise integral extensions of a transversely extending torsional roll stabilizer 70 which is journalled in elastically bushed bearing members 72 and 74 mounted on side rails 2 and disposed concentrically with respect to axis 68.

As best seen in FIGURE 2, when the described suspension arrangement is at the normal or design height position, the spring 44 is substantially flat and lies in a plane slightly inclined forwardly and upwardly and the lever member 64 extends longitudinally forward in generally parallel relation therewith. However, as seen in FIGURE 3, upon vertical deflection of the wheel 76, the wheel spindle 20 and support 32 are caused to move upwardly therewith with the result that bending deflection is exerted on spring 44 while simultaneously the lever member 64 describes an arc generated from the axis 68 so that the forward end thereof progressively moves rearwardly and upwardly with upward deflection of the wheel. Consequently, bending deflection of the spring is accompanied by progressive torsional deflection induced by the change in caster angle of support 32 dictated by the levers 64 and 66 are relatively flat in transverse section form to the angular change of support 32, the spring exhibits both bending and torsional deflection during rise and fall of the wheel thereby providing a variable spring rate at the wheel. Additionally, and concurrently, the change in caster angle of support 32 occurring in the manner indicated causes the wheel to deflect upwardly in a rearwardly sloping direction which results in pronounced resistance to acceleration squat.

In accordance with a further feature of the invention, the levers 64 and 66 are relatively flat in transverse section so that the forward ends thereof may readily yield laterally inwardly during upward and downward deflection of the respective wheel supports to allow for the change in wheel camber angle and lateral foreshortening dictated by the parallelogram linkage defined by the half axle 12 and the vertically adjacent half of spring 44.

As an additional feature of the invention, as seen in FIGURE 2, the bolt 52 is formed so that the portion 78 surrounded by the eye 48 is generated eccentric to the axis of end portions 80 and 82 journalled in the legs 36 and 38 to thus provide for adjustment of the wheel camber angle.

From the foregoing, it will be seen that a novel and improved vehicle suspension has been provided which not only beneficially modifies the normal operation of the single leaf spring but additionally accomplishes the result efficiently and economically by utilizing a torsional roll stabilizer in a manner in which the latter accomplishes its normal function as well as inducing the geometric changes necessary to cause torsional deflection of the primary spring.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a vehicle suspension, a sprung mass, a transverse leaf spring secured centrally on said sprung mass in a fixed horizontally inclined plane, a road wheel supporting structure disposed adjacent each of the opposite ends of said spring, longitudinally spaced pivot means connecting each supporting structure to the adjacent end of said spring for vertical movement in a transverse plane corresponding to the plane of free bending deflection of said spring, and means connected between said sprung mass and said wheel supporting structures operative during progressive bending deflection of said spring to induce progressive controlled torsional deflection therein whereby the spring exhibits variable rate characteristics.

2. The structure set forth in claim 1 wherein said wheel supporting structure exhibits caster angle change corresponding to the torsional deflection of said spring.

3. In a motor vehicle having a suspended differential, a pair of wheel supporting members disposed at opposite sides of said differential, a road wheel rotatably mounted on each support, a pair of oppositely extending live axles operatively connecting said wheels with said differential, a leaf spring extending transversely between said supports and pivotally connected thereto at its opposite ends on longitudinally extending axes, means fixedly attaching the central portion of said spring to said differential in a fixed horizontally inclined plane, a torsional stabilizer rotatably mounted on said vehicle on a transverse axis longitudinally displaced from the axis of rotation of said wheels, and lever means operatively connecting said stabilizer to said wheel supports.

4. The structure set forth in claim 3 wherein said longitudinally extending axes are displaced vertically from the axis of rotation of said wheels.

5. The structure set forth in claim 4 wherein said lever means are operatively connected to said wheel supports on a common imaginary axis, said last mentioned axis and said longitudinally extending axis being displaced vertically oppositely from the axis of rotation of said wheels.

6. A variable rate single-leaf spring suspension comprising a sprung mass, a pair of road wheel assemblies disposed beneath said sprung mass, a transverse leaf spring anchored centrally on said sprung mass in a fixed horizontally inclined plane, longitudinally extending pivot means connecting the opposite end of said spring to said wheel assemblies, and a pair of laterally spaced longitudinally extending arms connected at opposite ends to said sprung mass and said wheel assemblies, said arms acting upon vertical deflection of said wheel assemblies to impart torsional deflection to said spring which combined with the normal bending deflection thereof produces a variable load versus deflection rate.

7. The structure set forth in claim 6 wherein said arms are formed and arranged so as to offer minimal resistance to lateral displacement of the portion thereof connected to said wheel assemblies.

8. The structure set forth in claim 7 wherein said arms include a torsionally active portion journalled transversely on said sprung mass.

9. The structure set forth in claim 8 wherein each said supporting assemblies is formed with a pair of longitudinally spaced apart depending legs and each outer end of said spring is formed with an eye spanning the space between said legs.

10. The structure set forth in claim 9 wherein said legs and said eye are connected by pivot means including eccentric portions for adjusting the camber angle of said wheels.

References Cited
UNITED STATES PATENTS 2,157,773    5/1939    Probst _____ 180—73

A. HARRY LEVY, *Primary Examiner.*

UNITED STATES PATENT OFFICE
CERTIFICATE OF CORRECTION

Patent No. 3,379,269            April 23, 1968

Walter C. Zetye

It is certified that error appears in the above identified patent and that said Letters Patent are hereby corrected as shown below:

Column 2, line 35, "the levers 64 and 66 are relatively flat in transverse section" should read -- the lever 64. Since the outer end of the spring must con- --.

Signed and sealed this 9th day of September 1969.

(SEAL)
Attest:

Edward M. Fletcher, Jr.            WILLIAM E. SCHUYLER, JR.

Attesting Officer                         Commissioner of Patents